UNITED STATES PATENT OFFICE.

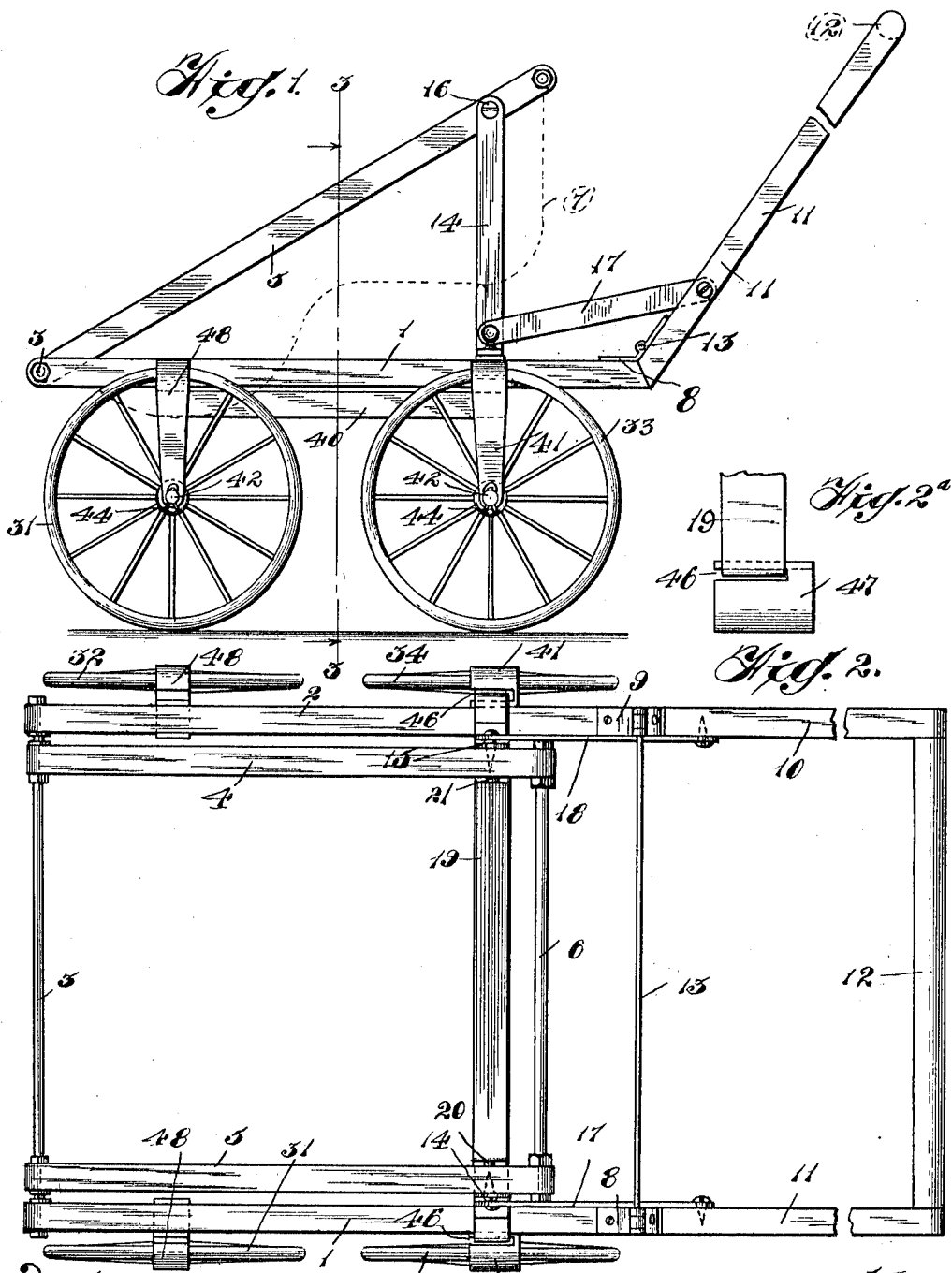

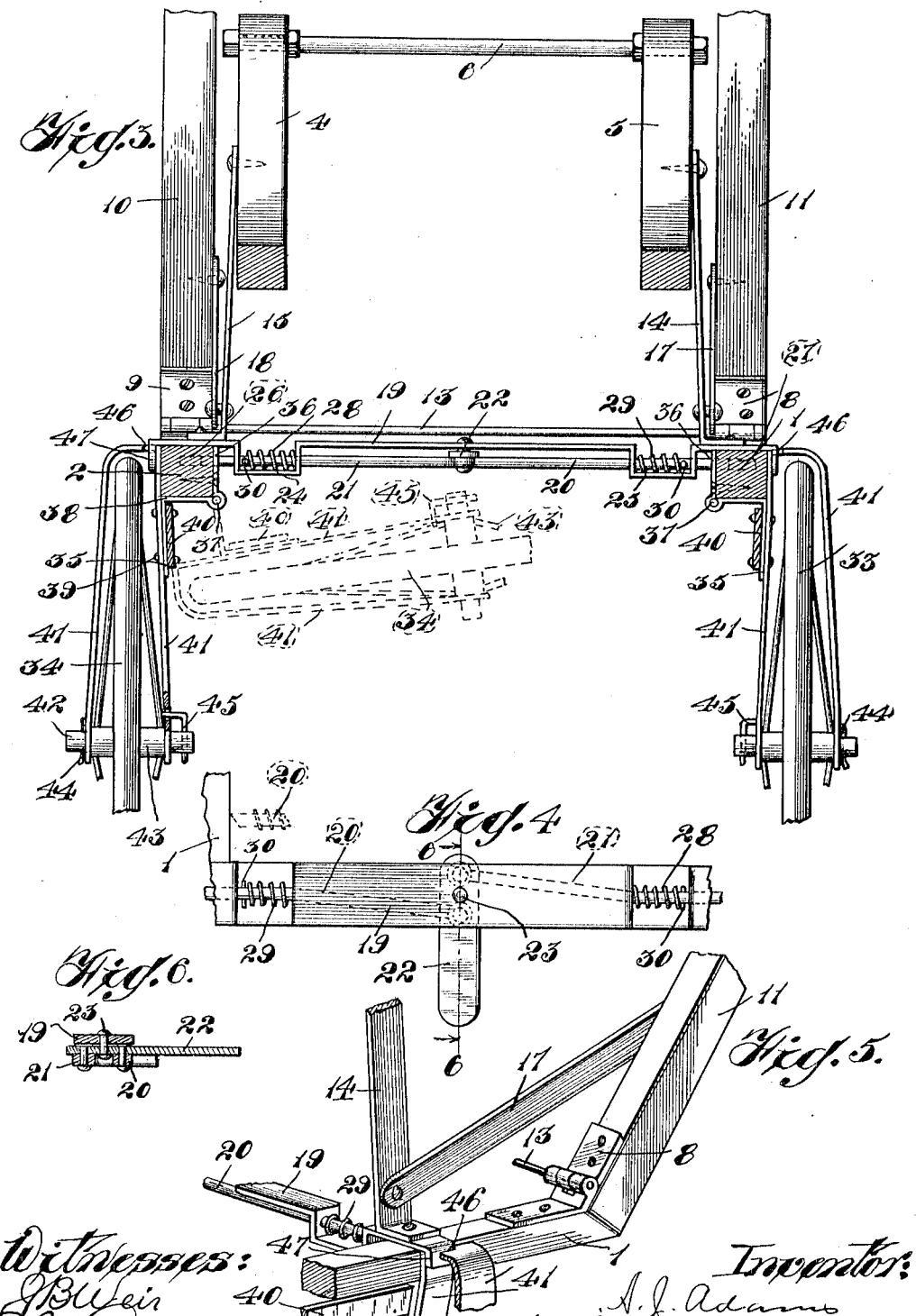

ARTHUR J. ADAMS, OF CHICAGO, ILLINOIS, ASSIGNOR, BY MESNE ASSIGNMENTS, TO WILLIAM S. FERRIS, OF ELKHART, INDIANA, AND ALEXANDER B. LEITH, OF CHICAGO, ILLINOIS, TRUSTEES.

PERAMBULATOR OR GO-CART.

1,102,182. Specification of Letters Patent. Patented June 30, 1914.

Application filed March 5, 1904. Serial No. 196,766.

*To all whom it may concern:*

Be it known that I, ARTHUR J. ADAMS, a citizen of the United States, residing at Chicago, in the county of Cook and State of Illinois, have invented certain new and useful Improvements in Perambulators or Go-Carts, of which the following is a full, clear, and exact specification.

My invention relates to perambulators or go-carts, and has for its primary object to provide a folding perambulator or go-cart which shall be of neat, inexpensive and durable construction and capable of folding into a compact form.
With these ends in view my invention consists in certain features of novelty in the construction, combination and arrangement of parts by which the said object and certain other objects hereinafter appearing are attained, all as fully described with reference to the accompanying drawings and more particularly pointed out in the claims.

In the said drawings:—Figure 1 is a side elevation of my improved perambulator, the seat being omitted but indicated by a dotted line. Fig. 2 is a plan view thereof. Fig. 2ª is a detail plan of one of the forks. Fig. 3 is an enlarged cross section taken on the line 3—3, Fig. 1. Fig. 4 is an enlarged detail plan view of a locking mechanism hereinafter described. Fig. 5 is a detail perspective view showing one of the wheel forks or supports partly broken away, and Fig. 6 is a detail transverse section taken on the line 6—6, Fig. 4.

The running gear frame is constituted by two side bars, 1, 2, which are preferably composed of wood, and a cross bar 3, which may be composed of an iron rod bolted through the side bars 1, 2, and also serving as the pivot or hinge for two side bars, 4, 5, of a hinged inclined seat frame, which is constituted by these side bars 4, 5, and a cross bar or rod 6 which is bolted through the upper or free ends of the bars 4, 5, and which may serve as a means of supporting the upper end of the seat fabric, not necessary to illustrate, but indicated at 7 by dotted lines in Fig. 1, while the lower end of such fabric may be secured to the cross bar 3. The rear ends of the side bars 1, 2, are connected by hinges 8, 9, to a folding handle, which is preferably of U-shaped form and constituted by two side bars 10, 11, and a cross bar 12, connecting their upper or free ends together. The lower end of this handle frame and the rear end of the running gear frame are tied together and prevented from spreading by a cross rod 13 which extends through and constitutes the pivots of the hinges 8, 9. The lower leaf of each of the hinges is bent upwardly above the lower ends of the side bars 10, 11, as shown in Figs. 1 and 5, so as to support the pivot point on bar 13 at a sufficient elevation above these lower leaves to permit the handle 10, 11, 12 to fold down upon the running gear frame in a position substantially parallel therewith, the running gear frame and the U-shaped handle both being wider than the seat support 4, 5, 6, so that when the latter is folded down into a horizontal position it will lie between the side bars 1, 2, and will be embraced by the handle 10, 11, 12, which is both wider and longer than the seat support.

The seat support is held in its inclined supporting position by two uprights or braces 14, 15, whose upper ends are pivoted at 16 to the side bars 4, 5, while their lower ends are pivoted respectively to two links 17, 18, which latter are also pivoted to the side bars 10, 11 of the handle, and thereby serve to move the braces 14, 15 forward and back as the handle is raised and lowered, thus automatically causing the seat supporting frame to rise or descend according to the direction in which the handle is moved. The lower ends of the seat support braces 14, 15, are secured together in any suitable way, such as a cross bar 19 having its ends extending across the two side bars 1, 2, and supported thereon with capability of sliding back and forth with the braces 14, 15 as the handle is raised and lowered. This cross bar 19 serves as a means of carrying and operating a lock for holding the braces 14, 15 in their upright or operative position, and this lock may consist of two longitudinally movable bolts or rods 20, 21, both pivoted to an operating lever 22, which is pivotally supported at 23 on the lower side of the bar 19, and the outer edges of these bolts 20, 21, pass through off-sets or angular bends 24, 25, formed in the bar 19 near its ends, and where they emerge from these off-sets they project into sockets 26, 27, formed in the side bars 1, 2, and thus lock the cross bar 19 against movement with the braces 14, 15. This locking is effected automatically as the cross bar 19 moves rearwardly during the movement of the handle 10, 11, 12, by two springs or other suitable cushions, 28, 29, one of which is sleeved on each of the bars or bolts 20, 21, between one side of the off-set and a pin or lug 30 passing through the bolt, so that when the bolts arrive at the sockets 26, 27, they will shoot into them.

Each of the four wheels, 31, 32, 33, 34, is journaled in a fork or wheel support, and each of these forks or wheel supports is hinged or pivotally connected to one of the side bars 1, 2, by similar means, a description of one of which will suffice for all. This means consists of a hinge having two leaves, 35, 36, pivoted or hinged together by a pintle 37 at the inner corner of the side bar. The upper leaf 36 is secured by any appropriate means to the inner face of the side bar, while the lower leaf has an angular bend at 38 so as to make it fit under the side bar and thence extend down the side of the fork, which will be presently described, and to which fork it is secured by rivets 39, or other suitable means, so that when the cross bar 19 is pushed forward the wheel and its fork may be folded upwardly and inwardly on the center 37. Each of the front forks or wheel supports is connected rigidly to one of the other forks or wheel supports by a longitudinal bar 40, pivoted or otherwise secured at each end to the inner face of the hinge leaf 35, so that when one of the rear wheel forks or supports is turned on its pivotal point 37 the front one will also be turned. Each of the rear wheel forks or supports is composed of an inverted U-shaped fork or flat bar bent into the form of an inverted U, 41, with its lower ends or branches pierced by an axle or pintle 42 upon which the hub 43 of the wheel is journaled. This pintle is held in place at one end by a cotter 44 while the other end is provided with an L-shaped pin 45, one branch of which extends downwardly through the pintle while the horizontal branch passes through the inner branch of the fork 41, and thus holds the pintle from rotating in the fork. The inner branch of the fork is secured to the outer face of the leaf 35 of the hinge, and such inner branch also extends above the bar 40 and rests flat against the outer side of the side bar 1 or 2 of the running gear frame and the upper end of the fork where it turns over the wheel is provided in its forward side with a notch 46 in which engages a lock or catch 47 formed by bending the end of the cross bar 19 downwardly at a slight distance from the face of the side bar of the running gear frame, so that with the fork in its upright position the cross bar may be drawn rearwardly by raising the handle from its folded position and thereby causing the lock or catch 47 to engage in the hook or notch 46, and thus lock the wheel fork from turning on its pivot 37, this locking being effected automatically with the locking of the cross bar 19 by the bolts 20, 21. It is understood, of course, that each of the rear forks is of the described construction and both ends of the cross bar 19 are provided with one of the catches or locks 47 for the purpose stated.

The front forks or wheel supports, which are shown at 48, are similar in construction to the rear forks 41 excepting that they are not provided with the notches or hooks 46, the same being unnecessary since the locking of the rear forks holds the front forks in position through the intermediary of the bars 40.

Having thus described my invention, what I claim as new therein, and desire to secure by Letters Patent is:—

1. In a folding perambulator, the combination of a running gear frame, a seat support hinged thereon, a brace for said support, a catch movable by said brace longitudinally of the frame, means for locking said brace against pivotal movement, and a hinged wheel support having means of engagement with said catch, whereby said wheel support is held against pivotal movement.

2. In a folding perambulator, the combination of a running gear frame, a seat support hinged thereon, braces for said support pivoted thereto at their upper ends and adapted to be supported at their lower ends by said frame, a handle hinged to said frame and connected with said braces for oscillating the latter on their pivots, hinged wheel forks or supports secured to said frame, a cross bar connecting said braces together, locks or catches supported on said cross bar and adapted to engage with said frame for locking the cross bar in position, and means carried by said cross bar for locking said wheel supports in position.

3. In a folding perambulator, the combination of a running gear frame, U-shaped wheel forks adapted to rest at their upper ends against the outer sides of said frame, hinges connecting said forks to the lower sides of said frame, whereby the forks may be folded under the frame, and means engaging the upper ends of the forks at a point above their pivotal points for holding said upper ends against the outer sides of the frame.

4. In a folding perambulator, the combination of a running gear frame, a wheel fork, a hinge having two leaves, one of which is secured to the inner side of the running gear frame and the other of which is secured to the inner side of said fork, said fork being projected above the hinge on the outer side of the frame and adapted to rest against the latter, and means for detachably securing the upper end of the fork in said position against the outer side of the frame.

5. In a folding perambulator, the combination of a running gear frame, front and rear wheel forks hinged to said frame on axes extending longitudinally thereof and adapted to fold under the frame, and a longitudinal bar secured to the sides of the said forks and connecting them together.

6. In a folding perambulator, the combination of a running gear frame, front and rear wheel forks hinged thereto, and a flat bar secured to the inner sides of said forks and connecting them together.

7. In a folding perambulator, the combination of a running gear frame, a wheel fork, a hinge connecting said wheel fork to said frame and having its pivotal point located inwardly from the outer side of the frame, whereby said fork will be drawn inwardly as it is folded under the frame, the upper end of the fork being projected above said pivotal point of the hinge and adapted to rest against the outer side of the frame, and means for locking the wheel support in position.

8. In a folding perambulator, the combination of a running gear frame, comprising a square side bar, a hinge having two leaves, one of which is secured to the inner side of said side bar, a wheel support secured to the other leaf of said hinge and projecting upwardly against the outer side of said bar, the pivotal point of said hinge being located at the lower inner corner of said bar, and means for locking the wheel support in its upright position.

9. In a folding perambulator, the combination of a running gear frame, a hinged seat support thereon, a brace for holding said support in position, a wheel support hinged to said frame and adapted to fold transversely thereof, said wheel support having a notch or hook in its edge, and a catch connected to said brace and slidable on said frame longitudinally thereof for engaging in said hook or notch and locking said wheel support in position.

10. In a folding perambulator, the combination of a running gear frame, a seat support pivoted thereon, a brace for sustaining said seat support, a cross bar secured to said brace and extending across said frame, downwardly projecting lips or lugs formed on the ends of said cross bar at the outer sides of said frame, wheel supports hinged to said frame and projecting upwardly over the outer sides thereof, and having means for engagement with said downwardly projecting lips or lugs for locking the wheel supports in position.

11. In a folding perambulator, the combination of a running gear frame, a hinged seat support thereon, a brace for sustaining said support, a cross bar secured to said brace and projected across said frame, and having off-sets formed therein, bolts projecting through said off-sets and into said frame, springs engaging with said bolts for forcing the latter into engagement with the frame, and an operating lever pivoted to said cross bar and to said bolts for simultaneously withdrawing them.

12. In a folding perambulator, the combination of a running gear frame, a handle hinged thereto, wheel supports hinged to said frame and adapted to fold thereunder, a cross bar slidable on said frame, and connected with said handle, and locking devices carried by the ends of said cross bar for engaging with said wheel supports and locking them in position.

13. In a folding perambulator, the combination of a running gear frame, a wheel fork hinged thereto and having its upper end projecting above the hinge and flattened against the outer side of the frame and provided with a notch in its edge and a lock or catch slidable longitudinally on the frame and adapted to engage in said notch for locking the wheel fork in position.

14. In a folding perambulator, the combination of a running gear frame, a wheel fork consisting of a flat bar of inverted U shape secured to said frame and having its lower branches perforated, a pintle projecting through the perforations of said branches, a pin having one end secured to one end of said pintle and the other end engaging in one branch of said fork for preventing the pintle from rotating, a wheel journaled on said pintle, and means for holding the pintle from withdrawal.

15. In a perambulator the combination of a running gear frame, wheel supports hinged thereto at their upper ends, a bar connecting said wheel supports rigidly together at points below the hinge points, and means for locking the wheel supports against rotary movement on their hinges.

16. In a folding carriage, the combination of a running gear frame, a hinged seat support, a handle foldable with relation to said running gear frame, and means connected with and operated by said handle and having a bearing on the frame beneath the rear portion of the seat-support, serving to elevate and depress the seat-support in the operations of folding and unfolding the handle.

17. In a folding carriage, the combination of a running gear frame, a hinged seat-support, wheel-supports on said frame and foldable with relation thereto, and means connected with a handle serving to elevate and depress said seat support in the operations of folding and unfolding the handle and equipped with means for locking the wheel-supports in their upright positions.

18. In a folding carriage, the combination of a running gear frame, a hinged seat support, wheel supports on said frame and foldable with relation thereto, and mechanism for moving the seat support in the operation of folding and unfolding the handle and for securing the wheel supports in their upright positions, comprising a plurality of connected links having connection with the seat support and handle and equipped with wheel-support locking means.

19. In a folding carriage, the combination of a substantially horizontal running gear frame, a seat support having pivotal connection with the front portion of said frame and capable of swinging from near the plane of the frame to a desired upwardly and rearwardly inclined plane, a handle having its lower portion pivotally connected with the rear portion of said frame, wheel supports pivoted on said frame and capable of swinging from an upright position to a position beneath said frame, and means serving in the raising and lowering of the seat support and in the locking of the wheel supports, comprising a plurality of connected links connected with the seat support and handle, whereby the movement of the handle may effect a movement of the seat support, and wheel support locks carried by said links.

20. In a folding carriage, the combination of a substantially horizontal running gear frame, a seat support having pivotal connection with the front portion of said frame and capable of swinging from near the plane of the frame to a desired upwardly and rearwardly inclined plane, a handle having its lower portion pivotally connected with the rear portion of said frame, wheel supports pivoted on said frame and capable of swinging from an upright position to a position beneath said frame, and means serving in the raising and lowering of the seat support and in the locking of the wheel supports, comprising a plurality of connected links, including a substantially vertical forwardly swinging brace-link having its upper end pivotally joined to the rear portion of the seat support, a link connected with the lower portion of the handle serving to actuate the brace-link, and a wheel support lock connected with said links.

21. In a perambulator, the combination of a running gear frame, a seat frame hinged thereto, a handle hinged to said running gear frame, braces for supporting the seat frame pivoted thereto, wheel supports rotatively mounted on the running gear frame, means carried by the said braces for locking the wheel supports, a cross bar connecting said braces together, and means connecting said cross-bar with said handle whereby the movement of the handle moves the cross bar and said braces.

22. In a folding perambulator or go-cart, the combination of a running gear frame, front and rear wheel supports hinged thereto at their inner sides so as to fold inwardly and having projections at their outer sides extending above their hinge points, said projections being adapted to be resisted in their rotary movement about the hinge points by the said frame whereby the outward hinging movement of the wheel supports at their lower ends will be limited, bars rigidly connecting the front and rear wheel supports together to cause each front wheel support to make its hinging movement in unison with its fellow rear wheel support, means for holding the wheel supports against inward hinging movement while in use, a folding seat support, and a folding handle.

23. In a folding perambulator or go-cart, the combination of a running gear frame, front and rear wheels, front and rear wheel supports for said wheels respectively, each rotatably connected with the frame so as to fold thereunder and embodying a member arranged at the inner side of its wheel and to which the wheel is secured, rigid horizontal bars connecting each of the rear wheel supports rigidly with its fellow front wheel support, said bars being arranged longitudinally of the running gear frame at the sides thereof and at points below the center of rotation of the wheel supports and at the inner sides of the wheels, so that when the wheels are folded under the frame said bars will be at the inner sides of the wheels, means for holding the wheel supports in their upright position, a handle, and a folding seat support.

24. In a folding perambulator or go-cart, the combination of a running gear frame, a seat support foldable with relation thereto, a handle foldable with relation to said frame and seat support, means connected with and operated by said handle and having a bearing on the frame at the rear portion of the seat support, serving to elevate and depress the seat support in the operations of folding and unfolding the handle, and means operatively related to the handle for locking the first said means in position when the handle is raised.

25. In a folding perambulator or go-cart, the combination with a substantially-horizontal running gear frame having side bars, a seat support foldable with relation to said frame, a handle foldable with relation to the frame and seat support, seat support braces flexibly connected with the seat support at their upper ends and being forwardly deflectable at their lower ends, the lower ends of the seat support braces being slidably supported by said side bars, an operative connection between said seat support braces and the handle serving to elevate and depress the seat support in the operations of folding and unfolding the handle, and means operatively related to said seat support braces for locking them in their upright position when the handle is raised.

26. The combination of a substantially horizontal running gear frame, a seat support pivotally connected at its forward end with said frame and foldable into a position substantially lengthwise of the said frame, a seat support brace for holding the seat support at a suitable elevation above the frame, having pivotal relation at one end with one of said parts and sliding relation at its other end with the other of said parts, and a handle movable from a position substantially lengthwise of and contiguous to said frame to an elevated position, said handle having operative relation to said brace and support for moving the same into position when the handle is moved.

27. The combination of a running gear frame embodying substantially horizontal side bars, a handle hinged to the rear portion of the running gear frame and foldable into a position substantially parallel therewith, a seat support having hinge connection at one end with the running gear frame and foldable into a position substantially lengthwise thereof, a seat support brace for supporting the other end of the seat support at a suitable elevation above the running gear frame, said brace having sliding bearing at one end and pivotal connection at the other end, and means connecting the brace with the handle whereby the operation of the handle moves the brace and seat support into position.

28. The combination of a substantially straight horizontal running gear frame, a substantially straight seat support hinged at its forward end to the running gear frame and movable from a position substantially parallel therewith to a position elevated at its rear end and inclined with relation to the running gear frame, a seat support brace movable from a position substantially parallel with the running gear frame to an upright position between the rear ends of the running gear frame and the seat support, said brace having pivotal relation at one end with one of said parts and sliding relation at its other end with the other of said parts, and a handle having operative relation to the brace for raising it and the seat support.

29. The combination of a substantially straight horizontal running gear frame, a substantially straight seat support embodying straight side bars hinged at their forward ends upon the running gear frame and movable from a position contiguous to and substantially parallel with the running gear frame to an elevated position, a handle having hinge connection at its lower end to the rear part of the running gear frame and movable from a position contiguous to and substantially parallel with the running gear frame, to an elevated position, and means operatively connecting the handle and seat support whereby the hinging movement of the handle serves to raise and lower the seat support.

30. The combination of a substantially horizontal running gear frame, a seat support embodying straight side bars hinged at their forward ends upon the running gear frame and movable from a position contiguous to and substantially parallel with the running gear frame to an elevated position, a handle having hinge connection at its lower end to the rear part of the running gear frame and movable from a position contiguous to and substantially parallel with the running gear frame, to an elevated position, means operatively connecting the handle and seat support whereby the hinging movement of the handle serves to raise the seat support, and locking means operatively related to the handle for locking the handle and seat support in position when the handle is raised.

31. The combination of a running gear frame, a U-shaped seat frame of less width than said first-named frame and pivotally connected therewith at its front end, a U-shaped handle of greater width than said second-named frame, and handle-actuated seat frame actuating means.

ARTHUR J. ADAMS.

Witnesses:
F. A. HOPKINS,
M. B. ALLSTADT.

Copies of this patent may be obtained for five cents each, by addressing the "Commissioner of Patents, Washington, D. C."